Aug. 18, 1936.　　　　G. E. DUNN　　　　2,051,248

CONSTANT VELOCITY UNIVERSAL JOINT

Filed Nov. 14, 1935　　　3 Sheets-Sheet 1

INVENTOR.
George E. Dunn
BY Myron J. Dikeman
ATTORNEY.

Aug. 18, 1936.  G. E. DUNN  2,051,248
CONSTANT VELOCITY UNIVERSAL JOINT
Filed Nov. 14, 1935  3 Sheets-Sheet 2

INVENTOR.
George E. Dunn
BY Myron J. Dikeman
ATTORNEY.

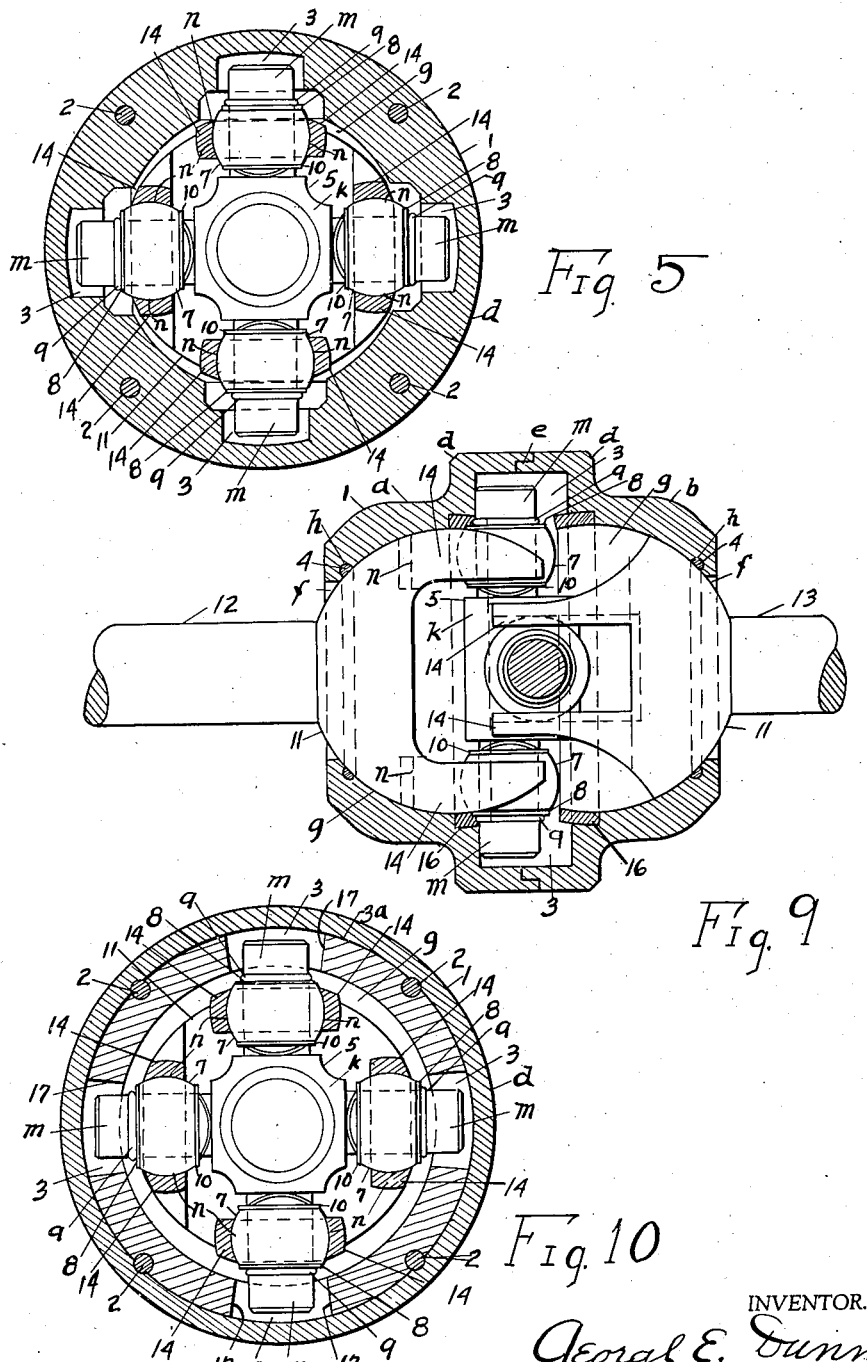

Patented Aug. 18, 1936

2,051,248

UNITED STATES PATENT OFFICE 2,051,248

CONSTANT VELOCITY UNIVERSAL JOINT

George E. Dunn, Dearborn, Mich.

Application November 14, 1935, Serial No. 49,659

5 Claims. (Cl. 64—21)

The object of my invention is to produce a universal joint coupling for connecting angular positioned shaft ends, for transmitting a constant velocity from one shaft to another.

Another object is to produce a constant velocity universal joint formed with an inclosing casing, designed to both function as an operating unit, and materially strengthen the joint coupling.

A further object is to produce a universal joint connection for angular positioned shaft ends, that are provided with an equalizing unit designed to maintain constant equal angles between the casing axis and the connected shaft center-lines.

A still further object is to produce a constant velocity universal joint that is simple in construction, efficient in its operation and that can be manufactured at a low cost.

These several objects are attained in the preferred form by the construction and arrangement of parts more fully hereinafter set forth.

Similar parts on all drawings are marked by similar numerals or letters.

Fig. 5 is a cross-sectional view taken on the line 5—5 of the Fig. 2, showing the relative position of the various adjusting members.

Fig. 9 is a modified longitudinal sectional view as taken on the line 2—2 of the Fig. 1, showing the alternate coupling cross installed in place of the straight cross, and also showing the special means for retaining the ball yokes within the frame recesses.

Fig. 10 is a modified cross-sectional view as taken on the line 5—5 of Fig. 2 showing a modified form of coupling cross bearing channel.

Figure 1:
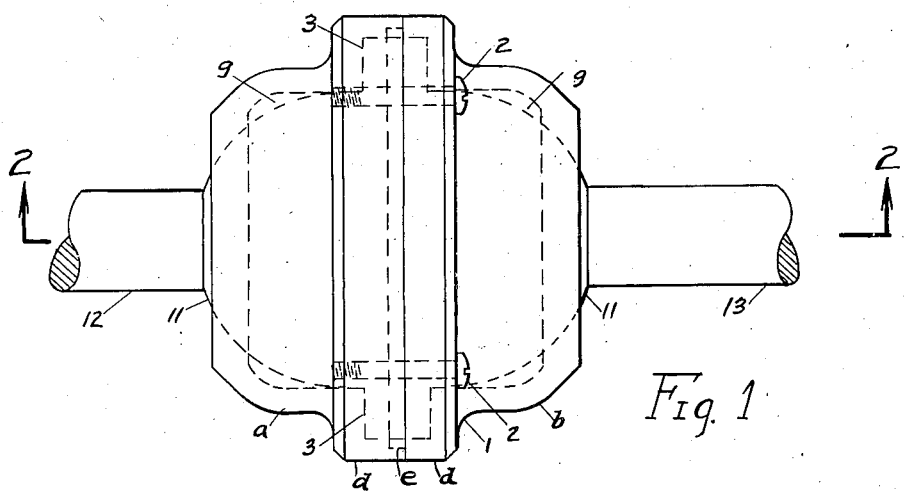
Fig. 1 is a side elevation of the assembled universal joint, showing the frame exterior and the connected shaft members mounted therein.
Figure 2:
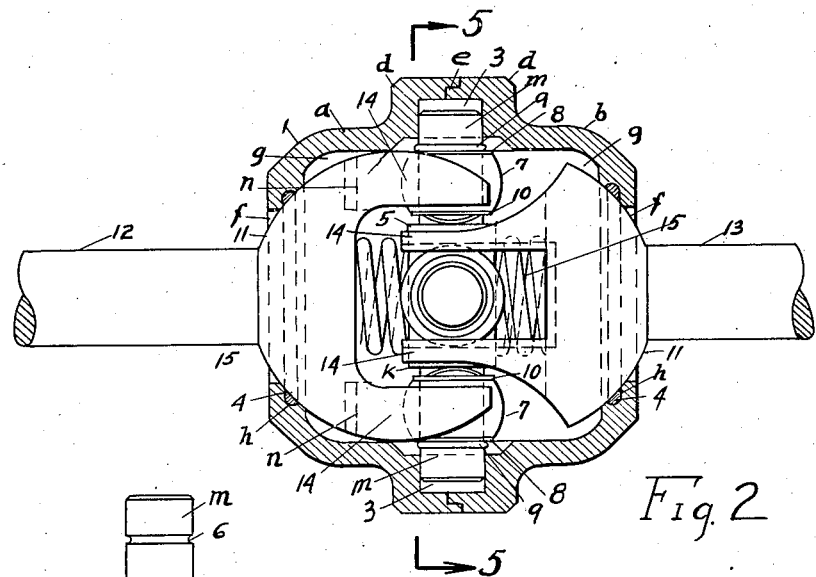
Fig. 2 is a longitudinal sectional view through the joint unit, taken on the line 2—2 of the Fig. 1, showing the general arrangement of the operating parts when connected between shaft ends in straight alignment.
Figure 6:
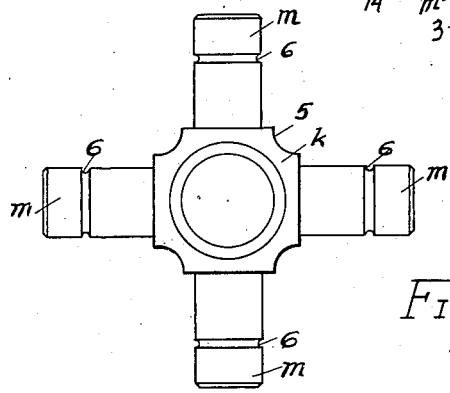
Fig. 6 is an elevation of the coupling cross showing the detailed construction of the several bearing members.

Much difficulty has been experienced with the usual type of trunnion pin universal joint, due to the variable velocity and vibration caused by the intermittent alternate changing of positions on the respective trunnion pin centers, each varying from zero to maximum velocity movement for each shaft rotation. My device is provided with an equalizing unit which makes constant and uniform adjustment of the rotating members, and produces a constant rotation to the driven shaft member. It is known that there are various types of universal joints in use at the present time, and joints utilizing the old coupling cross unit, but not of the construction and operation herein shown.

In general, my device comprises a casing member formed with double semi-cylindrical chamber sections, positioned aximetrically with the casing but with slightly separated centers, and carries mounted therein two spherical coupling yoke members pivotally connected together by a coupling cross fitted within the casing bearing grooves, designed to adjust radially therein and readjust the casing member during shaft rotation for producing constant equal angles between the casing axis and the connected center-lines.

I will now describe more fully the detailed construction of my device, referring to the drawings and the marks thereon.

Figure 4:
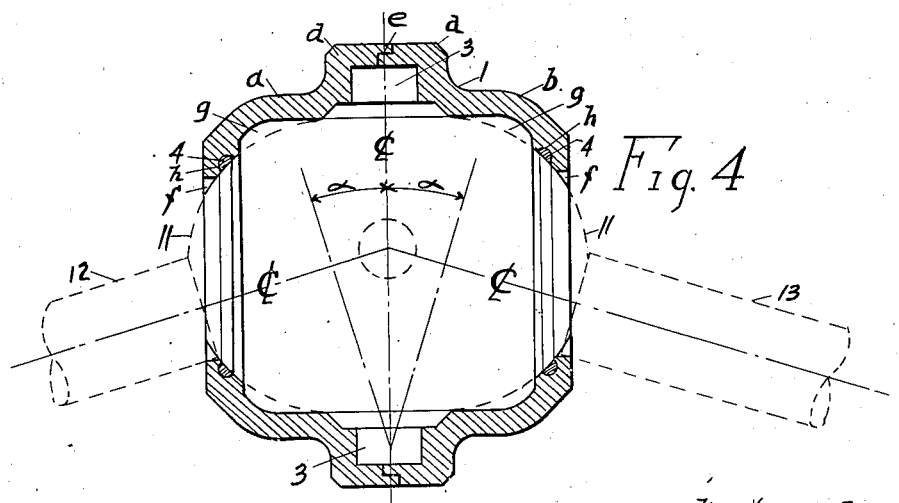
Fig. 4 is a diagrammatic view longitudinally through the joint the same as shown in the Fig. 3, showing the relative positions of the coupling and shaft center-lines, and the equal angles constantly formed therebetween.
Figure 7:
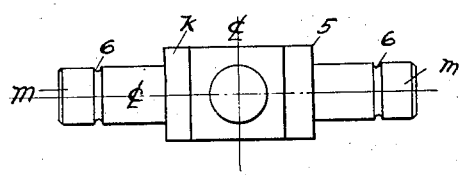
Fig. 7 is an edge view of the coupling cross as shown in the Fig. 6 showing the relative position of the bearing center-lines.

The casing 1 is made of metal, preferably of hard steel forgings, designed in two semi-spherical cup sections $a$ and $b$. The sections $a$ and $b$ are provided with circular flanged sections $d$ on the inner ends thereof, formed with corresponding joint grooves $e$ for fitting the sections together, and are securely united by the threaded bolts 2 mounted through the adjoining flanges. The sections $a$ and $b$ are provided with circular shaft openings $f$ at their respective outer ends, each positioned concentric with the assembled casing axis. Within each casing section $a$ and $b$ is formed a semi-spherical chamber $g$, preferably hardened and ground, each positioned concentric with the casing axis and with their respective sphere centers separated, as illustrated in Fig. 4 of the drawings. Within the flange sections d are formed two pairs of bearing grooves 3, arranged radially in a circle, concentric with and at right angles to the casing axis, said bearings of each pair being positioned diametrically opposite each other and with their common axis at right angles to the axis of the other pair of bearings. The casing end shaft openings f are preferably provided with packing rings 4 formed of some suitable material, and function as both dust rings and grease retaining units, said packing rings being pressed within suitable wall grooves h, or they may be mounted thereon by any other suitable means desired. Within the casing bearing grooves 3 is mounted a special coupling cross 5, made of hardened steel, preferably formed with a rectangular center block k, and is provided with cylindrical trunnion pins m projected from each edge thereof, said opposite pins being positioned concentric about the same center-line axis and with the respective axis at right angles to each other in the same plane with the center block k. Each trunnion pin m is formed with an annular groove 6, and carries rotatably mounted thereon a spherical roller 7, said roller being retained in position by an end washer 8 and spring clip 9 engaging the pin groove 6. A special spring washer 10 is mounted on each trunnion pin m between the respective rollers 7 and the center block k, providing a slight longitudinal adjustment of the rollers on their pin mountings. The length of each trunnion pin m is slightly less than the radial length to the bottom of the respective groove bearing 3, allowing longitudinal movement therein as provided by the elongated bearing grooves. Within each casing chamber g is fitted a semi-spherical ball yoke 11 as may be mounted, or formed, on the respective ends of shafts 12 and 13, but herein shown as made integral therewith, said yoke ball diameters being the same as the inclosing casing chamber g and are free to rotate freely therein. Each ball yoke 11 is provided with two pairs of protected lug members 14 formed on the inner face thereof, positioned on opposite sides of the supporting shaft center-line and parallel therewith. Each of said pairs of lugs 14 are extended beyond the casing center and are formed with a common cylindrical raceway n therebetween, preferably hardened and ground for producing a true cylindrical surface. The cylindrical raceways n are of a diameter and are positioned to receive therein and fit over the respective trunnion rollers 7. which are free to rotate or slide therein as each yoke ball 11 is adjusted within its respective casing chamber g. Compression coil springs 15 are mounted between the inner surface of each ball yoke 11 and the adjacent face of the coupling cross center block k, for retaining each yoke 11 firmly seated against its respective chamber wall and packing ring 4. These coil springs 15 may be omitted if the casing 1 is constructed with interior retaining rings 16, as illustrated in Fig. 9 of the drawings, and which are extended beyond the ball centers retaining them in place for all rotatable positions.

If desired, the bearing grooves 3 may be formed by turning a continuous recess groove 3a within the casing flange d as shown in the Fig. 10, and separating the respective bearing openings 3 by intervening circular segment fillers 17. The construction cost is materially reduced by this design, although the operation is the same as in the former case.

Figure 8:
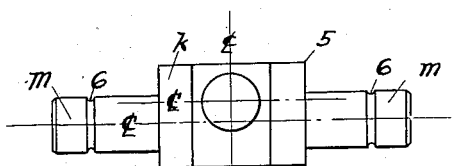
Fig. 8 is an edge view of a modified form of coupling cross with off-set center-lines for opposite bearings.

In cases where a greater angle is desired between the connected shafts 12 and 13, the axis of the different pairs of trunnion pins m may be separated and positioned in different parallel planes as indicated in Figs. 8 and 9, and with the respective casing bearing grooves 3 adjusted accordingly. The remaining construction and operation is exactly the same as heretofore described.

Figure 3:
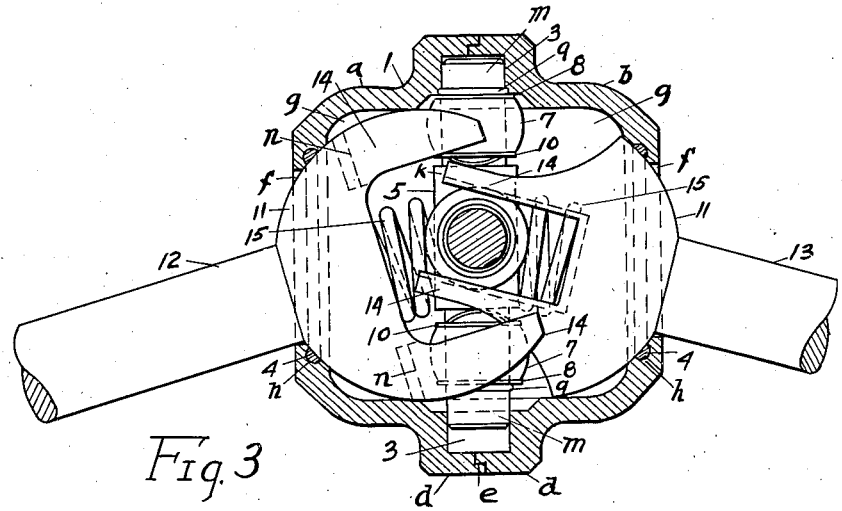
Fig. 3 is also a longitudinal sectional view taken on the same line 2—2 of the Fig. 1, showing the relative position of the same members when the shafts are positioned at an angle with each other.

When my universal joint is properly assembled between two shaft members 12 and 13, in straight alignment, the coupling cross 5 assumes a neutral, central position within the bearing grooves 3, and with the trunnion pin ends withdrawn from their respective bearing ends as shown in the Figs. 2, 5, 9 and 10 of the drawings, and will rotate as a solid connecting unit between the shaft ends. However, when the shafts 12 and 13 are set at an angle with each other as illustrated in Fig. 3, the ball yokes 11 rotate in their respective casing chambers g and likewise swing the connected lugs 14 and interior raceways n, therewith constantly readjusting the connected coupling cross 5 radially, to the outer, or obtuse angle side, during the shaft rotations. The coupling cross 5 is confined within the circular bearing grooves 3, at right angles to the casing axis and can adjust therein radially only. An equal and opposite angular movement is transmitted through the coupling cross 5 into the opposite yoke 14. The plane through the center-line of the trunnion pins m, at all times and for all casing positions will bisect the resulting angle between the shaft center-lines as illustrated in Fig. 4. The casing 1 is constantly adjusting over the yoke balls 11, and thereby will transmit a constant velocity from the driving shaft to the driven shaft member, and without the usual intermittent velocity variation caused by successive periodic alternate joint movements experienced in the former free joint type. The spring washers 10 allow for any longitudinal adjustment of the spherical trunnion rollers 7 necessitated by the swinging arm lugs, and which slightly lengthen the distance between the roller centers for the various tilted arm positions.

It is apparent that my device is subject to various modifications in both application and in mechanical design without departing from the spirit of my invention, and I claim not only the design herein shown, but any other construction that may be substantially a substitution of parts herein shown.

Having fully described my constant velocity universal joint, what I claim as my invention and desire to secure by Letters Patent is:

I claim:

1. A universal joint adapted for transmitting a constant velocity from one shaft to another and used therewith, comprising a hollow casing member formed with oppositely disposed semi-spherical chambers within the casing ends, oppositely disposed shaft connecting yokes rotatably mounted within each of said chambers, an equalizer unit adjustably mounted cross-wise said casing center within suitable casing recesses, said equalizer unit being positioned between the shaft connecting yoke ends and pivotally connected to each at alternate intervening quadrant points, said equalizer unit being adjustable radially within the casing in directions at right angles to the casing axis, and capable of transmitting at a uniform velocity the movements of one shaft connecting yoke to the other.

2. A universal joint adapted for transmitting a constant velocity of one shaft to another and used therewith, comprising a casing member formed with two semi-spherical chambers oppositely disposed in the casing ends and concentric about the casing axis, oppositely disposed shaft connecting ball yokes rotatably mounted within said chambers, a cross-trunnion equalizer unit adjustably mounted cross-wise the casing center within suitable casings recesses, said equalizer unit being positioned between the shaft connecting ball yoke ends and pivotally connected to each yoke through alternate trunnion pin bearings with centerlines at right angles to each other, said equalizer being adjustable radially within the casing recesses capable of transmitting at a uniform velocity the movements of one yoke to the other.

3. A universal joint for connecting two angularly positioned shaft ends rotatably together, and used therewith, comprising a casing member formed with two semi-spherical chambers oppositely disposed within the casing ends and concentric with the casing axis, said chambers being positioned with separated spherical centers and formed with concentric shaft end openings therein, two oppositely disposed shaft connecting ball yokes rotatably mounted within the said chambers positioned with their shaft ends projected through the casing end openings, each of said shaft connecting ball yokes being formed with projected lug raceways on the inner face thereof, a cross-trunnion equalizer unit adjustably mounted within casing bearing grooves cross-wise the casing center and positioned between the said ball yokes and pivotally connected to each yoke lug raceway through alternate trunnion pin bearings and at right angles to each other, said equalizer unit being adjustable radially within the casing at right angles to the casing axis capable of transmitting the movement of one shaft connecting ball yoke to the other.

4. A universal joint adapted for connecting two oppositely and angularly positioned shaft ends rotatably together and used therewith, comprising a casing formed with two semi-spherical chambers oppositely disposed within the casing ends and concentric with the casing axis, two oppositely disposed shaft connecting ball yokes rotatably mounted within said chambers positioned with their shaft connecting ends projected through the casing end openings, each of said yokes being formed with projected lug raceways in the inner face thereof, a cross trunnion equalizer unit formed with the trunnion bearing axis at right angles to each other adjustably mounted within suitable casing bearing grooves formed crosswise the casing center, each of said trunnion bearings being provided with a spherical roller rotatably mounted thereon, said alternate rollers being designed to engage and fit rotatably the raceways of oppositely disposed yoke lugs capable of transmitting radially the movement of one shaft connecting yoke to the other.

5. A universal joint adapted for connecting two angularly positioned shaft ends rotatably together and used therewith, comprising a casing member formed with two semi-spherical chambers oppositely disposed within the chamber ends and concentric with the casing axis, said casing being formed with concentric end shaft openings therein, two oppositely disposed shaft connecting ball yokes rotatably mounted within said chambers positioned with their shaft connecting ends projected through the casing end openings, each of said ball yokes being formed with projected lug raceways on the innerface thereof, a cross trunnion equalizer unit formed with bearing axes at right angles to each other but in separated parallel planes, and adjustably mounted within suitable casing bearing grooves cross-wise the casing center positioned between the said ball yokes and pivotally connected to each ball yoke lug raceway through alternate trunnion bearings by suitable bearing connecting means, said equalizer unit being adjustable radially cross-wise said casing, capable of transmitting any movement of one shaft connecting ball yoke uniformly to the other.

GEORGE E. DUNN.